United States Patent Office 3,391,658
Patented July 9, 1968

3,391,658
SELF-ADJUSTING HOLDDOWN DEVICE
Robert W. Williams, Brookville Road,
Brookville, N.Y.
Filed Aug. 10, 1967, Ser. No. 659,651
3 Claims. (Cl. 107—57)

ABSTRACT OF THE DISCLOSURE

This invention relates to an oven having a holddown device of this invention for retaining the covers of bread baking pans firmly upon the pans during the bread shaping process, said oven being of the tunnel type having an endless moving conveyor. The holddown device comprises a pair of endless chains having a plurality of self-adjusting hinged plates therebetween, which adjust themselves to the various pan heights used in the bread making process.

The object of this invention is to eliminate locking hardware presently used on baking pans.

This invention is illustrated in the accompanying drawing in which.

Figure 1:
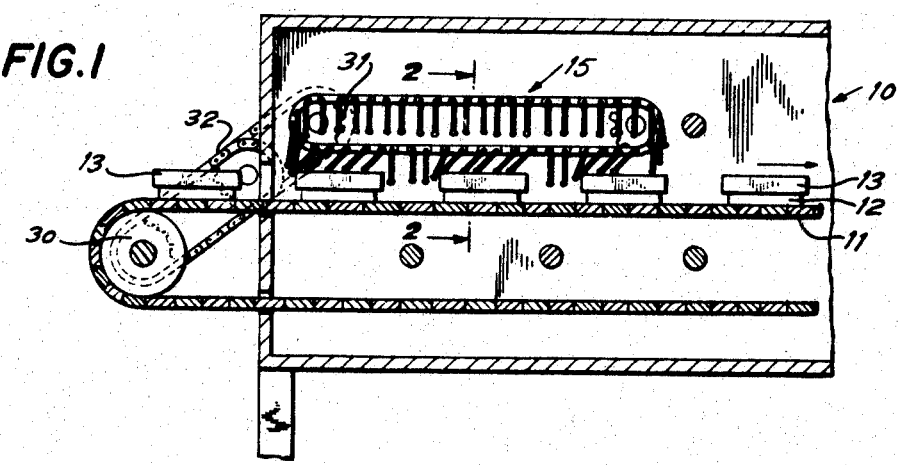
FIG. 1 is a cross section of a part of a tunnel type oven showing the manner of conveying covered baking pans through the oven also the manner in which the endless chain device of this engages the covered pans.

According to this invention the cover of a baking pan is held snugly to the pan so that it at all times engages the upright walls of the pan during the critical shape assuming period of the bread making process.

The covers are placed on the pans before going into the proof box where yeast action takes place. When these covered pans are introduced into the oven there is a tendency for the cover to rise due to the expansion of the gases in the bread mass. This expansion effect is overcome by the device of this invention.

Turning to the drawing, a commercial tunnel type oven 10 having a slat conveyor 11 and conventional compartmented baking pans 12 with close fitting covers 13 thereon and having insulated oven walls 14, is provided with the holddown device of this invention.

Figure 2:
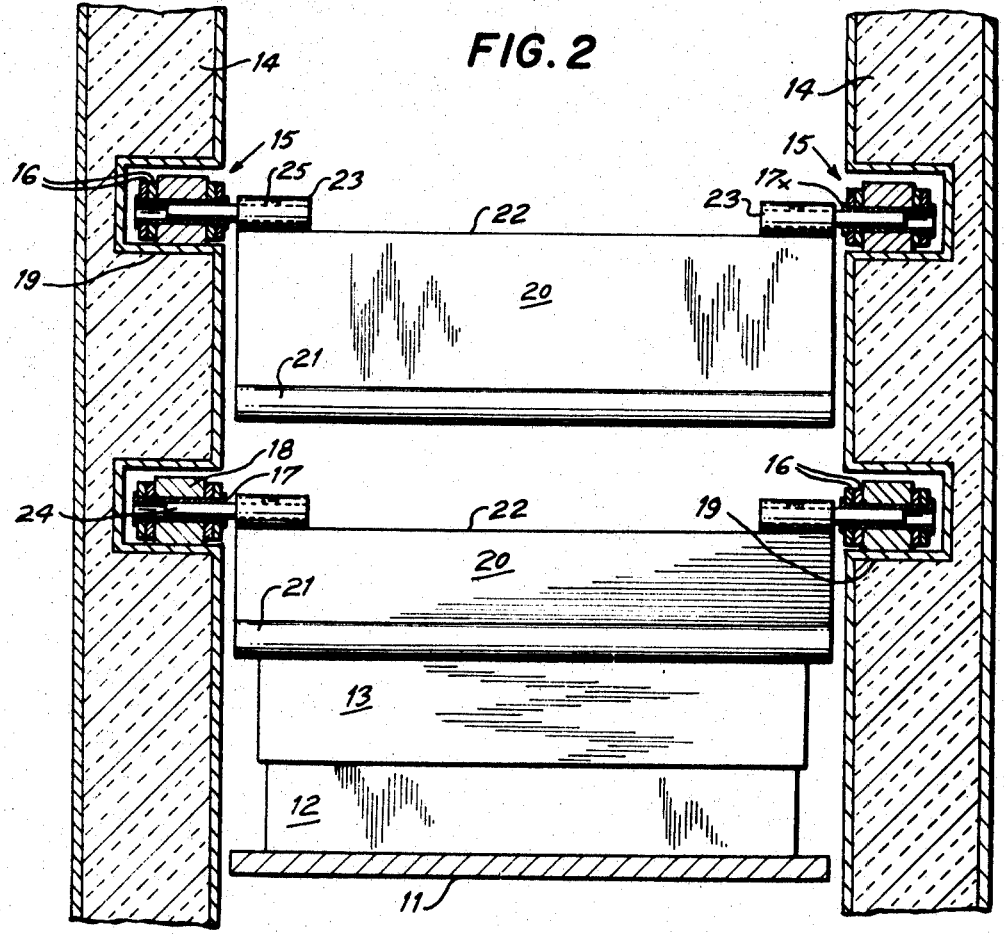
FIG. 2 is a section view taken on line 2—2 of FIG. 1 and showing the gravity relationship of a plate to a baking pan with a cover thereon and showing also the manner of return of the plate to accomplish continuous operation.

As shown in FIG. 2, the device comprises a pair of conventional spaced apart parallel disposed endless chains 15, each chain having a plurality of pairs of spaced apart links 16 with hollow bushings 17 therein, upon which steel rollers 18 are mounted.

The bushings 17 are provided with flanged ends 17X. The links 16 are disposed on each side of the rollers 18. The rollers 18 travel on metal tracks 19, which may be located in recesses of the opposing oven walls 14. However, the tracks 19 may be attached to the oven walls by hangers or otherwise.

A feature of this invention is the provision of a plurality of swingable weighted elements disposed transversely over the oven conveyor and adapted to engage the covers of the baking pans during the critical shaping period of bread formation.

Preferably the weighted element of this invention is a metal plate 20, having an integral round depending edge 21. The edge 21 may be a separate tubular element welded to the plate, if desired. The round edge 21 facilitates the sliding engagement of the plate with the covered pan.

The plate 20 preferably is of rectangular configuration and is provided on its top edge 22 with a pair of opposing metal tubes 23 welded thereto. A cylindrical rod 24 is slidably mounted in each tube 23 and fixed therein by set screw 25.

In mounting the plates 20 to a pair of opposing rollers 18 in opposing link chains of the oven, the pair of rods 24 of the plate are each slidably returned into a respective tube 23. Next the opposing tubes 23 of the plate are aligned with the opposing bushing 17 of opposing rollers 18. The rods 24 are then pushed into the hollow bushings 17 and locked in place by set screws 25.

Thus the rods 24 and the plate move as a unit swingably in the bushings 17 of the opposing chains as they engage the covers 13 on pans 12.

The use of pans of uniform covered height permits the plate to effect uniform weight distribution onto the pans and thus to counteract the expansion of the baking bread. Thus the captive dough in the covered pans is given its captive shape while being baked on a slowly moving conveyor within a travel of space and time of about one third of the baking cycle.

The holddown chains 15 travel at the same speed as the conveyor 11, since the drive gear 30 of the conveyor is used to drive a like gear 31 attached to these chains. In order to have chains 15 and conveyor 11 travel in the same direction during the baking cycle, an intermediate gear 31 is used.

I claim:
1. A continuous self-adjusting holddown device for holding bakery pan covers onto baking pans with constant pressure while traveling in a commercial tunnel type oven comprising a pair of spaced apart parallel disposed link chains adapted to be secured to opposing oven walls, each of said chains having a double row of spaced apart links secured together by hollow bushings, a roller disposed upon each bushing, a longitudinal plate disposed between respective opposing rollers of said opposing chains, tubular means disposed on a longitudinal edge of said plate at the opposing ends thereof and rods slidably disposed in said tubular means and in said hollow bushings whereby said plate is swingably mounted between and to said chains.

2. The device of claim 1 having an integral cylindrical depending edge.

3. The device of claim 2 wherein said tubular means on said plate are metal tubes welded to said plate and are provided with set screws to engage said rods in locking relationship.

References Cited

UNITED STATES PATENTS

| 1,636,082 | 7/1927 | Stevens et al. | 15—97 |
| 2,004,269 | 6/1935 | Colvin et al. | 15—97 |
| 3,100,564 | 8/1963 | Levy | 198—165 |
| 3,142,374 | 7/1964 | Carter | 198—165 |

FOREIGN PATENTS

| 212,799 | 2/1958 | Australia. |
| 231,389 | 12/1960 | Australia. |

WALTER A. SCHEEL, *Primary Examiner.*

ARTHUR O. HENDERSON, *Examiner.*